T. MIDGLEY.
BEAD CONSTRUCTION.
APPLICATION FILED SEPT. 3, 1920.

1,403,091.

Patented Jan. 10, 1922.

INVENTOR
Thomas Midgley.
BY
ATTORNEY

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

BEAD CONSTRUCTION.

1,403,091.

Specification of Letters Patent.  Patented Jan. 10, 1922.

Application filed September 3, 1920. Serial No. 407,998.

*To all whom it may concern:*

Be it known that I, THOMAS MIDGLEY, a citizen of the United States of America, residing at Hampden, in the county of Hampden and State of Massachusetts, have invented certain new and useful Improvements in a Bead Construction, of which the following is a specification.

This invention relates to the construction of open bellied tire casings, more particularly to a bead construction, and to an improved method of fastening strain-resisting laminations to bead anchoring devices at the base edges of the tire to improve its construction. By the use of the invention certain of the tire building operations are greatly facilitated and a better tire construction is provided with less work than heretofore.

My invention consists in more effectively combining the strain-resisting laminations with the anchoring means than has been accomplished by prior constructions, so that such laminations will be in a better position to resist the strains in use. This feature of the invention is particularly important in making large tires. In large tires the number of laminations make the construction of the bead edges difficult as generally practiced and where this difficult work is not performed with considerable care and skill the tires will be far below the desired standard.

The prior practice of building includes the laying of each ply of the strain-resisting laminations over a core and shaping it to the core by stretching it circumferentially over the crown and stretching it radially down on the sides and then for the most part tying it to the anchoring means by folding and lapping it around the same in various ways.

When one depends principally upon the folds of the plies around the endless anchoring means to hold the free edges of the laminations, the building operations result in a greatly crowded condition at the bead. The workman needs to fold over the edges of the plies, trim excess material, and work the folds to proper position, and much depends upon his skill and care in this work. Even with skillful work the edges of the plies frequently need to be distorted from their best position to properly function with an endless anchoring means and serve in the desired manner as strain-resisting layers in the tire.

According to my invention I provide a tire structure and a method of building the same with any desired number of laminations into U shaped tire form under desired tension and anchoring these laminations in properly balanced condition at the edges to the bead anchoring means without folding them around said means or crowding the material into bead form. To do this I lay the laminations or stretch them into tire shape and leave the edges disposed adjacent the anchoring means but without being folded therearound. So far as practical I prefer to have the edges of each ply extend straight down the sides of the tire and end adjacent to and at about the level of a circular endless anchoring wire. Now if the plies are stretched and held in this position they are in the best position to resist strain. Furthermore the bead or base edges of the tire are not unduly enlarged by any folds or crowding in of the anchoring edges of the strain-resisting material at the bead edge. To anchor the edges of adjacent plies I preferably provide one or two annular strips of rubberized fabric made up separately and independently of the plies. I then fold such strips once over each endless wire and bring the free edges together so that when the wire is placed in its position at the edge of the casing the annular edges of the strips extend upwardly and between sets of downwardly extending free edges of the plies of adjacent laminations. Then when the bead edges or base of the casing is vulcanized under pressure the adjacent laminations are effectively joined or bonded to one another and the contiguous laminations are bonded to the circular and endless strips containing the endless anchoring wires in such a way that each of the wires is bonded to the strain-resisting elements to anchor them. In this construction I depend primarily upon the vulcanized lapped joints between the separately folded strips and the free edges of the particular plies in contact with them to hold the strain-resisting laminations, which are bonded to one another, to the anchoring means at the bead.

Not only does the construction give a better lay of the strain-resisting elements in the side walls and edges of the tire and permit these elements to perform their function but the bead edges of the tire can be made up with practically no trimming and in far more accurate form than has heretofore been the practice. The work required in making the bead by the improved method is much less than required by prior practice.

The foregoing general description can be best understood by a reference to the accompanying drawings which disclose the invention specifically in its preferred form.

In the tire shown there are fourteen plies of strain-resisting rubberized material of any desired character. To anchor this material at the bead edges there are four endless wires or cables, $a$, $b$, $c$, and $d$, at one edge and four cables $a'$, $b'$, $c'$, and $d'$ at the other edge. Both bead edges are constructed in the same manner and a description of one will suffice.

Figure 3:
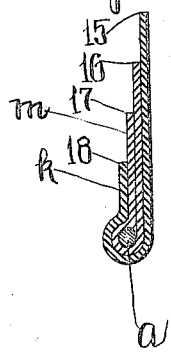
Fig. 3 is a detail cross sectional view through one of the bead anchoring wires with the separate anchoring strips of fabric folded around the wire.

An endless wire or cable $a$ has two annular or circular plies of rubberized fabric $k$ and $m$ folded around it as indicated in Fig. 3. The ends of the fabric are preferably so placed that they step off as at 15, 16, 17 and 18. This complete covering fabric for the bead wire is separate from and additional to the strain-resisting material of the laminations although its character or kind may be the same or similar. Each bead wire, $a$, $b$, $c$, and $d$ is separately folded into like plies of the fabric $k$ and $m$ so as to have each wire separately encased. The bead anchoring means then consist in a plurality of bead wires each encased in endless bands of rubberized fabric with the circular edge portions thereof extending radially and outwardly from the endless bead wire substantially in the plane thereof. The bead anchoring means may be prepared as separate assemblies before they are embodied in the tire casing.

Figure 1:
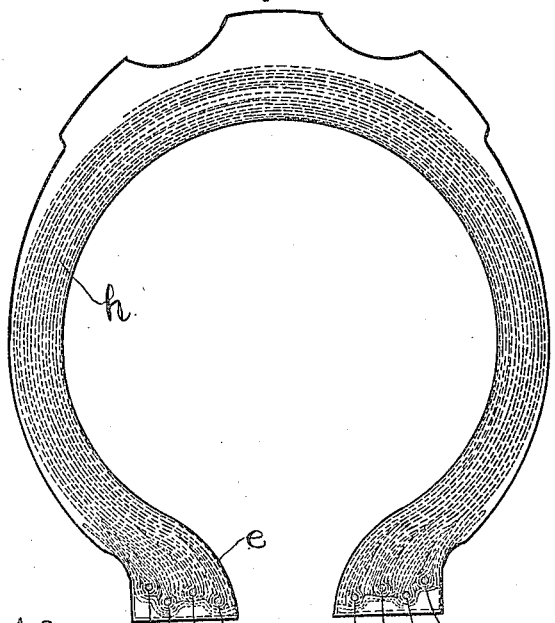
Fig. 1 is a cross section of the improved tire.
Figure 2:
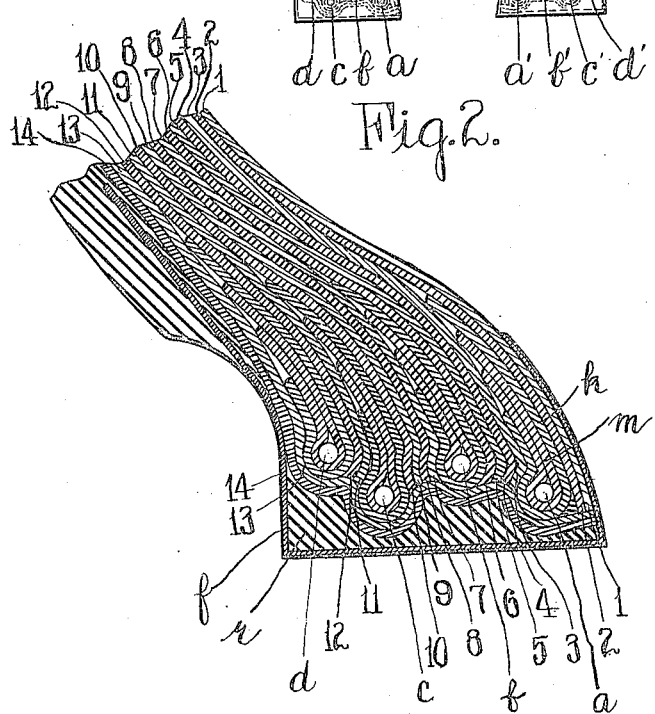
Fig. 2 is an enlarged detail sectional view through one bead or base edge of the tire.

The tire indicated in the drawing may then be built according to this invention by shaping laminations or plies 1 and 2 usually around a core and with the primary object of so positioning said fabric that it will best function in its strain-resisting capacity. The free edges are brought against one another and into position at about the diameter of bead wire $a$. The bead wire $a$ with its associated fabric is laid against ply 2 and pressed into position as shown in Fig. 2 so that the stepped ends 15, 16, 17, and 18 progress respectively away from ply 2. Plies 3, 4, 5, and 6 are successively shaped in a similar manner and in these operations ply 3 is pressed against the stepped ends 15, 16, 17 and 18 to make a lap joint with the exposed faces of fabric $k$ and $m$ on the outer side. A second bead wire $b$ with its fabric $k$ and $m$ is now pressed against ply 6 just as the first wire $a$ was pressed against ply 2. Plies 7, 8, 9, and 10 are successively shaped to tire form as the other plies were and ply 7 is pressed against the fabric band of bead wire $b$. Bead wire $c$ is then pressed against ply 10 as shown. Plies 11 and 12 are then shaped and ply 11 pressed against the fabric band of wire $c$. Bead wire $d$ is now positioned with its fabric band against ply 12. Plies 13 and 14 are shaped to have the former against the fabric band of the bead wire $d$. The bead form of casing $h$ may be filled out if desired by rubber $r$ and chafing strip $f$ which may both be readily shaped as shown during the vulcanizing step without disturbing the bead anchoring means.

The above description is necessarily made in some considerable detail for the purpose of a specific illustration but the operations themselves are exceedingly simple.

In the form of the invention as drawn I have shown a straight side tire casing $h$. The diameters of the bead wires or cables $a$, $b$, $c$ and $d$ may be made up differently and the bead contour determined largely by the position of the bead wires and the number of the plies placed between such wires. The space which would normally be left between plies by the insertion of a bead wire is filled very nicely in the illustrated invention by the stepped off ends 15, 16, 17 and 18 of the separate bead wire fabric band and which act much as a wedge between the plies and permit the latter to extend into the bead in the most effective manner.

I prefer in some cases as in the one illustrated to carry the last two plies 13 and 14 under the bead anchoring means $a$, $b$, $c$, and $d$ to form in one manner of description a fabric seat for the lower ends of the anchoring means and the ends of the laminations or plies 1 to 12 inclusive. This bend of the last two plies 13 and 14, however, is optional and does not change that spirit of my invention which is to rely upon the lapped joints between the edges of the plies and separate fabric bands pocketing the anchoring wires as the means to hold the strain-resisting material to the bead edges.

The sides of the plies 1 to 12 extend straight down the sides of the casing and terminate without folds at about the level of one or more adjacent bead anchoring wires. This arrangement permits accurate and easy laying of the strain-resisting material at the bead edges and when this material is pressed against adjacent plies and against the fabric bands of the anchoring wires the whole sticks together due to the rubberized condition of the fabric when unvulcanized.

It is customary to vulcanize the tire beads under pressure. Therefore the vulcanizing step in finishing the tire will cause an effective and secure vulcanized bond between all the plies and between the lapped joints between certain of the plies and the fabric pockets in which the anchoring wires are held.

Among other advantages the tire resulting from the practice described above will have its strain-resisting laminations arranged in a better balanced condition for use than where the edges are folded and crowded into shape around the bead anchoring means.

The invention has been specifically described in one preferred form but is broadly defined in some of the appended claims.

I claim:

1. In a tire casing a bead construction having in combination at each edge of the casing a plurality of annular wires or cables separated one from the other and an annular rubberized band encasing each wire with an annular portion extending away from the wire, side edge portions of the rubberized strain-resisting laminations of the casing arranged between the wires to hold them apart and vulcanized to adjacent bands to effectively anchor the laminations to said wires.

2. A bead construction for a tire casing comprising a plurality of individual anchoring members disposed in a series across the bead, a plurality of plies of rubberized carcass forming material, and individual rubberized flexible anchorages attached to respective individual anchoring members and vulcanized to the carcass material.

3. A bead construction for a tire casing comprising a plurality of individual anchoring members disposed in a series across the bead, a plurality of plies of rubberized carcass material extending to and between said members, and individual rubberized flexible anchorages encasing respective anchoring members and vulcanized to adjacent carcass material to form the sole effective bond between the anchoring members and carcass material.

4. An inextensible bead construction for a tire casing comprising an inextensible anchoring member, a plurality of plies of rubberized carcass material extending to and on each side of said member, and a rubberized flexible anchorage encasing the anchoring member and provided with an integral radially disposed wedge shaped band vulcanized to the carcass material to form an effective bond between the anchoring member and carcass material.

5. A bead construction for a tire casing comprising a plurality of inextensible endless wires or cables, a plurality of plies of rubberized carcass material with their ends separated in groups by the wires lying between, and a rubberized flexible anchorage for each wire arranged to encase it and provided with a band extending radially into vulcanized lap joint and bonding contact with the ends of adjacent carcass plies.

6. A bead construction for a tire casing comprising a plurality of plies of rubberized carcass material with their sides terminating in the line of the strain they are to principally resist, an inextensible anchoring means positioned between plies and adjacent the termination of the sides, a rubberized flexible anchorage encasing said means and including a flap extending along said line of strain and bonded to adjacent plies by vulcanization to serve as the sole effective anchorage between the plies and anchoring means.

7. An anchoring device adapted to be secured to the carcass-forming plies of a tire casing to anchor them in the bead portion of the casing comprising an inextensible anchoring member, a plurality of annular rubberized bands folded once around said wire and brought into overlapping contact with the ends progressively stepped off so as to form a wedge shaped flexible anchorage flap extending away from the member.

8. The method of building the carcass portion of a tire casing comprising providing a plurality of sets of carcass-building material each comprising one or more plies, providing as separate assemblies a plurality of bead anchorages each having an annular rubberized fabric strip folded therearound with a portion of said strip projecting from the anchorage, and alternately superposing a set of carcass-building plies and bead anchorages at each side thereof, until the desired carcass thickness is formed, the projecting portion of the strip extending between the sets of plies and the plies extending substantially straight between said projecting portions and terminating adjacent the anchorages without being folded therearound.

9. The method of building the carcass portion of a tire casing on a core comprising shaping on the core certain of the plies of the rubberized carcass-building material with the side portions thereof extending in substantially straight and unfolded condition and terminating at substantially the bead line of the casing, providing as an assembly separate from the casing an annular bead anchoring member with an annular rubberized fabric strip folded therearound and extending outwardly from the bead anchoring member substantially in the plane thereof, pressing said assembly against the side portions of the previously laid plies of carcass-building material so as to adhere thereto, shaping on the core over the elements so laid additional plies of the carcass-building material with the side portions thereof extending in substantially straight and unfolded condition and terminating at substantially the bead line of the casing, providing a second assembly of a bead anchoring member with an annular rubberized fabric strip flolded therearound, pressing said second assembly against the side portions of the partially built-up carcass so as to adhere thereto, and repeating the operations of shaping plies of carcass-building material substantially straight down the side of the carcass and adherently securing thereto a separately formed assembly of a bead anchorage with a fabric strip until the desired number of plies of carcass-building material has been laid.

THOMAS MIDGLEY.